United States Patent
Cho et al.

(10) Patent No.: US 12,469,103 B2
(45) Date of Patent: Nov. 11, 2025

(54) APPARATUS AND METHOD WITH IMAGE PROCESSING

(71) Applicant: Samsung Electronics Co., Ltd., Suwon-si (KR)

(72) Inventors: Sung Kwang Cho, Seoul (KR); Geonwoo Kim, Suwon-si (KR); Yang Ho Cho, Seongnam-si (KR); Deokyoung Kang, Suwon-si (KR); Dong Kyung Nam, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 534 days.

(21) Appl. No.: 17/903,480

(22) Filed: Sep. 6, 2022

(65) Prior Publication Data

US 2023/0206392 A1 Jun. 29, 2023

(30) Foreign Application Priority Data

Dec. 27, 2021 (KR) .................. 10-2021-0188408

(51) Int. Cl.
*G06T 3/40* (2024.01)
*G06T 3/4015* (2024.01)
*G06T 3/4038* (2024.01)
*G06T 5/50* (2006.01)

(52) U.S. Cl.
CPC .......... *G06T 3/4015* (2013.01); *G06T 3/4038* (2013.01); *G06T 5/50* (2013.01); *G06T 2207/20081* (2013.01); *G06T 2207/20224* (2013.01)

(58) Field of Classification Search
CPC ....... G06T 3/4015; G06T 3/4038; G06T 5/50; G06T 2207/20081; G06T 2207/20224
See application file for complete search history.

(56) References Cited

U.S. PATENT DOCUMENTS 9,979,942 B2    5/2018  Lim et al.
2021/0360179 A1* 11/2021  Dangi ...................... G06T 5/60
2022/0092357 A1*  3/2022  Takada .................. G06F 18/214
(Continued)

FOREIGN PATENT DOCUMENTS

CN    111696036 A  *  9/2020  ........... G06K 9/4628
EP     3 202 131        11/2016
(Continued)

OTHER PUBLICATIONS

NPL: Priority Date Range: May 31, 2001 to Dec. 29, 2023; Publication Date Range: Jan. 23, 2003 to Jul. 1, 2025.*
(Continued)

*Primary Examiner* — Quang N Vo
(74) *Attorney, Agent, or Firm* — NSIP Law

(57) ABSTRACT

An apparatus with image processing includes: one or more processors configured to: generate a full sampling image by demosaicing a first color filter array (CFA)-based input image; based on a trained color conversion model trained for color conversion and noise suppression of the full sampling image, determine a bias and a conversion matrix corresponding to each pixel of the full sampling image; and based on the conversion matrix and the bias, convert a color space of the full sample image, corresponding to the first CFA, into a color space corresponding to a second CFA.

24 Claims, 10 Drawing Sheets

(56) References Cited

U.S. PATENT DOCUMENTS

2022/0132001 A1\* 4/2022 Dinh .................. G06N 3/045
2024/0129446 A1\* 4/2024 Qian .................. H04N 23/951

FOREIGN PATENT DOCUMENTS

KR  10-2011-0079315 A  7/2011
KR  10-2023-0037953 A  3/2023

OTHER PUBLICATIONS

NPL: Results Publication Date Range: Dec. 4, 2002 to Jun. 19, 2025.\*
Kim, K., et al. "Image Signal Processor for CMOS image sensors with Merged perations." *The 12th Korean Conference on Semiconductors.* Feb. 2005. pp. 29-30.

\* cited by examiner

APPARATUS AND METHOD WITH IMAGE PROCESSING

CROSS-REFERENCE TO RELATED APPLICATIONS

This application claims the benefit under 35 USC § 119 (a) of Korean Patent Application No. 10-2021-0188408, filed on Dec. 27, 2021 in the Korean Intellectual Property Office, the entire disclosure of which is incorporated herein by reference for all purposes.

BACKGROUND

1. Field

The following description relates to an apparatus and method with image processing.

2. Description of Related Art

An image sensor may obtain image information related to an external object by converting light reflected from the external object into an electrical signal. In an electronic device, such as a smartphone, a tablet PC, and/or a digital camera, various image signal processing (ISP) operations may be performed to convert an electrical signal obtained by an image sensor into a color image, which is actually recognized by humans, or to improve image quality. ISP may refer to image processing that processes raw data received by an image sensor, such as a camera. Typically, ISP may refer to a series of operations of outputting an RGB image by receiving a Bayer-patterned image. The ISP, for example, may include an operation of placing a color filter having an RGB pattern on a photodiode of an image sensor and interpolating a color of a position of the photodiode; auto white balance (AWB) adjusting a white object to appear white; performing color conversion matrix (CCM) for color correction on RGB data; gamma correction transforming an intensity of light; and a denoising operation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus with image processing includes: one or more processors configured to: generate a full sampling image by demosaicing a first color filter array (CFA)-based input image; based on a trained color conversion model trained for color conversion and noise suppression of the full sampling image, determine a bias and a conversion matrix corresponding to each pixel of the full sampling image; and based on the conversion matrix and the bias, convert a color space of the full sample image, corresponding to the first CFA, into a color space corresponding to a second CFA.

The trained color conversion model may be trained based on a loss function corresponding to a difference between another full sampling image, determined to correspond to a training image, of a color space corresponding to a second CFA and ground truth data corresponding to the training image.

The trained color conversion model may include a first output layer configured to output the conversion matrix corresponding to the full sampling image and a second output layer configured to output the bias corresponding to the full sampling image.

The trained color conversion model may be configured to control, based on a noise parameter corresponding to brightness of the CFA-based input image, a level of noise reduction of an image output using the trained color conversion model.

For the generating of the full sampling image, the one or more processors may be configured to: based on a determined weight corresponding to each channel of the first CFA and a value of a channel of the first CFA corresponding to each pixel of an input image, generate the full sampling image comprising values of channels of the first CFA corresponding to each of the pixels of the input image; and update values of channels corresponding to each pixel of the full sampling image by applying the full sampling image to at least one trained layer.

The determined weight corresponding to each channel of the first CFA may be determined using a trained demosaicing model, the at least one trained layer may be included in the trained demosaicing model, and the trained demosaicing model may be trained based on a loss function based on a difference between the full sampling image of the color space corresponding to the first CFA determined to correspond to a training image and ground truth data corresponding to the training image.

For the converting of the color space of the full sampling image, the one or more processors may be configured to, based on a preset equation, by performing an operation with the conversion matrix, the bias, and a pixel value of the full sampling image, convert values of channels of the first CFA corresponding to each pixel of the full sampling image into values of channels of the second CFA.

The one or more processors may be configured to generate a second-CFA based image by mosaicing the converted full sampling image.

Each pixel of the first CFA-based input image may include a value of any of channels comprised in the first CFA, each pixel of the full sampling image may include values of the channels comprised in the first CFA, and each pixel of the converted full sampling image may include values of channels comprised in the second CFA.

A color spectrum corresponding to the first CFA may be wider than a color spectrum corresponding to the second CFA.

The first CFA may include complementary color filters in cyan, magenta, and yellow, and the second CFA may include primary color filters in red, green, and blue.

In another general aspect, a processor-implemented method with image processing includes: generating a full sampling image by demosaicing a first color filter array (CFA)-based input image; based on a trained color conversion model trained for color conversion and noise suppression of the full sampling image, determining a bias and a conversion matrix corresponding to each pixel of the full sampling image; and based on the conversion matrix and the bias, converting a color space of the full sampling image, corresponding to the first CFA, into a color space corresponding to a second CFA.

The trained color conversion model may be trained based on a loss function corresponding to a difference between another full sampling image, determined to correspond to a training image, of a color space corresponding to a second CFA and ground truth data corresponding to the training image.

The trained color conversion model may include a first output layer configured to output the conversion matrix corresponding to the full sampling image and a second output layer configured to output the bias corresponding to the full sampling image.

The trained color conversion model may be configured to control, based on a noise parameter corresponding to brightness of the CFA-based input image, a level of noise reduction of an image output using the trained color conversion model.

The generating of the full sampling image may include: based on a determined weight corresponding to each channel of the first CFA and a value of channel of the first CFA corresponding to each pixel of the input image, generating the full sampling image comprising values of channels of the first CFA corresponding to each of the pixels of the input image; and updating values of channels corresponding to each pixel of the full sampling image by applying the full sampling image to at least one trained layer.

The determined weight corresponding to each channel of the first CFA may be determined using a trained demosaicing model, the at least one trained layer may be included in the trained demosaicing model, and the trained demosaicing model may be trained based on a loss function based on a difference between the full sampling image of the color space corresponding to the first CFA determined to correspond to a training image and ground truth data corresponding to the training image.

The converting of the color space of the full sampling image may include, based on a preset equation, by performing an operation with the conversion matrix, the bias, and a pixel value of the full sampling image, converting values of channels of the first CFA corresponding to each pixel of the full sampling image into values of channels of the second CFA.

The method may include generating a second-CFA based image by mosaicing the converted full sampling image.

In another general aspect, one or more embodiments include a non-transitory computer-readable storage medium storing instructions that, when executed by one or more processors, configure the one or more processors to perform any one, any combination, or all operations and methods described herein.

In another general aspect, an apparatus with image processing includes: one or more processors configured to: generate a first full sampling image by demosaicing a training image obtained using a first color filter array (CFA); generate, using a color conversion model, a second full sampling image, corresponding to a second CFA, based on the first full sampling image; obtain a first ground truth (GT) image corresponding to the first full sampling image and a second GT image corresponding to the second full sampling image; and train the color conversion model based on a loss function corresponding to a difference between the first full sampling image and the first GT image and a difference between the second full sampling image and the second GT image.

The one or more processors may be further configured to: generate a third full sampling image by demosaicing a first color filter array (CFA)-based input image; based on the trained color conversion model, determine a bias and a conversion matrix corresponding to each pixel of the third full sampling image; and based on the conversion matrix and the bias, convert a color space of the third full sample image, corresponding to the first CFA, into a color space corresponding to the second CFA.

For the generating of the first full sampling image, the one or more processors may be configured to generate the first full sampling image using a demosaicing (DMSC) model, and the one or more processors may be further configured to train the DMSC model based on the loss function.

The loss function may correspond to either one of mean absolute error (MAE) and mean squared error (MSE).

Other features and aspects will be apparent from the following detailed description, the drawings, and the claims.

BRIEF DESCRIPTION OF THE DRAWINGS

FIGS. 2A and 2B illustrate examples of types of color filter arrays.

Figure 1:
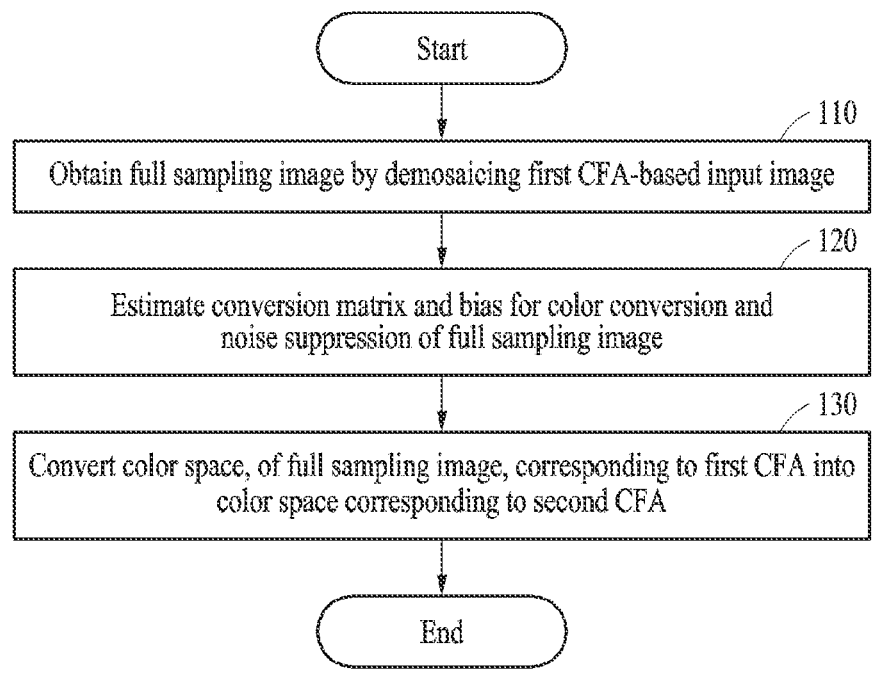
FIG. 1 illustrates an example of an image processing method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

Although terms, such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Throughout the specification, when a component is described as being "connected to," "coupled to," or "joined" another component, it may be directly "connected to," "coupled to," or "joined" the other component, or there may be one or more other components intervening therebetween. In contrast, when an element is described as being "directly connected to," or "directly coupled to," or "directly joined" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

The terminology used herein is for describing various examples only and is not to be used to limit the disclosure. The articles "a", "an", and "the" are intended to include the plural forms as well, unless the context clearly indicates otherwise. The term "and/or" includes any one and any combination of any two or more of the associated listed items. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Hereinafter, example embodiments will be described in detail with reference to the accompanying drawings. When describing the example embodiments with reference to the accompanying drawings, like reference numerals refer to like elements and a repeated description related thereto will be omitted.

FIG. 1 illustrates an example of an image processing method.

Referring to FIG. 1, the image processing method may include operation 110 of obtaining (e.g., determining or generating) a full sampling image by demosaicing an input image based on a first color filter array (CFA) or color filter mosaic (CFM), operation 120 of estimating (e.g., determining or generating) a bias and a conversion matrix for color conversion and noise suppression of the full sampling image, and operation 130 of converting a color space, corresponding to the first CFA, of the full sampling image into a color space corresponding to a second CFA. As described below, operation(s) corresponding to one or more operations included in the image processing method may be performed by a processor of an image processing apparatus.

A CFA or CFM may be a two-dimensional (2D) array of which a color filter, through which a predetermined wavelength of light passes, is disposed in a predetermined pattern at a position of each pixel of an image sensor. A color image including pixels through which light corresponding to a predetermined color transmits may be obtained by an image sensor including a CFA combined with a monochrome pixel detecting brightness of black and white. A type of CFA may be classified by types and disposition of an included color filter. For example, referring to FIG. 2A, an RGB Bayer filter may be a CFA having a structure including a repeated 2×2 matrix in which a red R filter and a green G filter RG, and a green G filter and a blue B filter GB are disposed, and referring to FIG. 2B, a CMY Bayer filter may be a CFA having a structure including a repeated 2×2 matrix in which a magenta M filter and a yellow Y filter MY, and a yellow Y filter and a cyan C filter YC are disposed.

The CFA may include channels respectively corresponding to colors of included color filters, and may correspond to a color space represented by values of the channels or colors of the color filters. For example, an RGB Bayer filter may include channels R, G, and B, and may correspond to an RGB color space represented by a combination of values of the channels R, G, and B.

A color image obtained by a sensor combined with the CFA may be referred to as a CFA-based image. When each pixel of a CFA-based image is combined with a filter, each pixel may include color information represented by a value of a channel of the CFA. For example, a pixel of an RGB Bayer filter-based image may include any one of a value of channel R, a value of channel G, and a value of channel B.

Figures 2A, 2B:
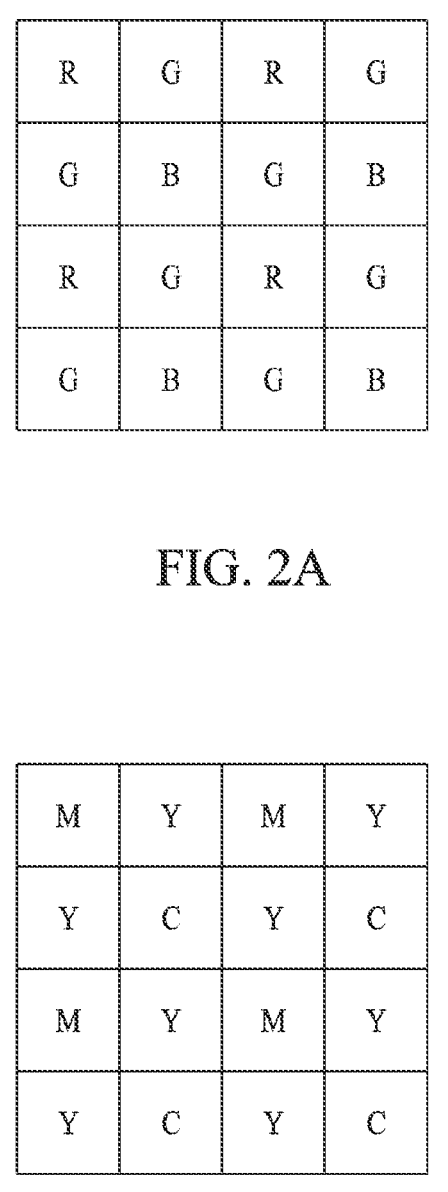

A first CFA-based input image may be an image received from an image sensor combined with a first CFA, and each pixel of the first CFA-based input image may include a value of any one of channels respectively corresponding to color filters included in the first CFA. The first CFA may be or correspond to various types of CFAs, and for ease of description, hereinafter, the first CFA is described as a CMY Bayer filter, as shown in FIG. 2B, including complementary color filters in cyan, magenta, and yellow. In this case, the first CFA-based input image may be a CMY Bayer filter-based image, and may be referred to as a CMY Bayer image.

In operation 110, the first CFA-based input image may be converted into a full sampling image including all values of all channels of the first CFA through a demosaicing algorithm. Demosaicing may be a technique of restoring an image having one value of one channel in one pixel to an image having all values of all channels in one pixel. For example, when H denotes the number of horizontal pixels of an image and V denotes the number of vertical pixels of the image, by demosaicing an input image having a size of H×V×1ch, a full sampling image having a size of H×V×Nch (N is a natural number equal to or greater than 3) may be obtained (where N=3 and each channel corresponds to a respective one of channel C, channel M, and channel Y, as a non-limiting example).

Operation 110 may include an operation of obtaining, based on estimated weights corresponding to channels of the first CFA, respectively, and values of channels of the first CFA corresponding to pixels of the input image, respectively, the full sampling image including values of channels of the first CFA corresponding to each pixel of the input image, and an operation of updating values of channels corresponding to each pixel of the full sampling image by applying the full sampling image to at least one trained layer (e.g., one or more trained layers).

A value of a channel, which does not exist in a corresponding pixel, may be obtained by multiplying a weight by a value of a channel corresponding to a predetermined pixel of the input image. For example, corresponding to a predetermined pixel, when C denotes a value of a channel corresponding to a cyan filter, M denotes a value of a channel corresponding to a magenta filter, and Y denotes a value of a channel corresponding to a yellow filter, a value of channel Y and a value of channel C of a pixel corresponding to channel M may be obtained by Equation 1 shown below, for example, a value of channel M and a value of channel C of a pixel corresponding to channel Y may be obtained by Equation 2 shown below, for example, and a value of channel M and a value of channel Y of a pixel corresponding to channel C may be obtained by Equation 3 shown below, for example.

$$Y==w_1 \times M, \ C=w_2 \times M \quad \text{Equation 1:}$$

$$M=w_3 \times Y, \ C=w_4 \times Y \quad \text{Equation 2:}$$

$$M=w_5 \times C, \ Y=w_6 \times Y \quad \text{Equation 3:}$$

In Equations 1 to 3, $w_1$ to $w_6$ may denote estimated weights corresponding to channels of the first CFA, respectively, and, for example, may be obtained by a trained demosaicing model. A non-limiting example of the trained demosaicing model will be described below.

By Equations 1 to 3, a full sampling image including values of channels of the first CFA respectively corresponding to pixels of an input image may be obtained. The values of channels corresponding to pixels of the obtained full sampling image may be updated based on at least one trained or learned layer (e.g., one or more trained layers). The at least one trained layer may be included in the trained demosaicing model. The trained demosaicing model may be or correspond to a trained model based on a loss function related or corresponding to a difference between a full sampling image, estimated to correspond to a training image, of a color space corresponding to the first CFA and ground truth data corresponding to the training image.

Operation 110 may include an operation of converting the first CFA-based input image into the full sampling image including values of all channels of the first CFA through various demosaicing algorithms. In other words, the first CFA-based input image may be converted into the full sampling image including values of all channels of the first CFA in each pixel through various demosaicing algorithms.

Operation 120 may include an operation of estimating a bias and a conversion matrix corresponding to each pixel of the full sampling image, based on a trained color conversion model. For example, based on a color conversion model, a 3×3 conversion matrix and a 3×1 bias corresponding to each pixel may be output.

The trained color conversion model may include a first output layer configured to output a conversion matrix corresponding to an input image and a second output layer configured to output a bias corresponding to the input image. The conversion matrix and the bias may be output through different layers. The trained color conversion model may be or correspond to a trained model trained based on a loss function related or corresponding to a difference between a full sampling image, estimated to correspond to a training image, of a color space corresponding to a second CFA and ground truth data corresponding to the training image. The trained color conversion model may control a level of noise reduction of an image output from the trained color conversion model, based on a noise parameter corresponding to brightness of the input image. A non-limiting example of the trained color conversion model will be described below.

Figure 2C:
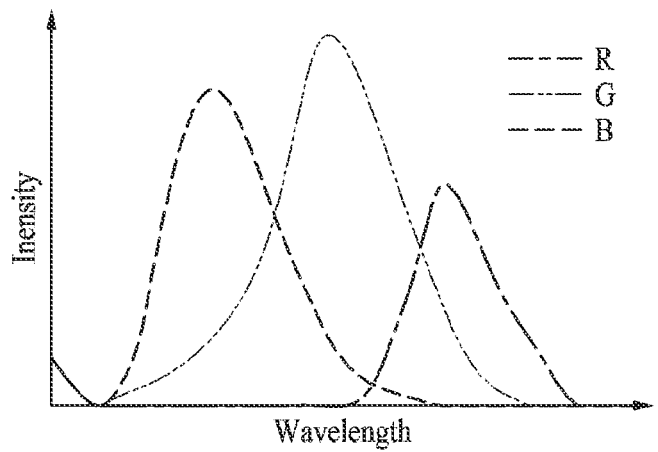
FIGS. 2C and 2D illustrate examples of a color spectrum of RGB and a color spectrum of CMY, respectively.
Figure 2D:
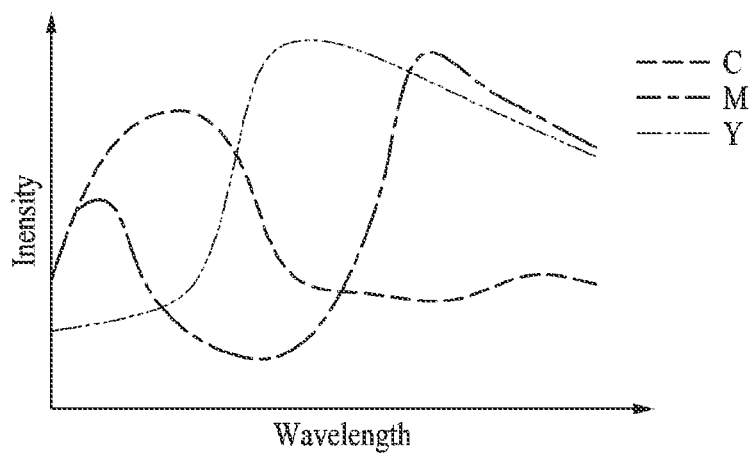

Operation 130 may include an operation of converting the color space, corresponding to the first CFA, of the full sampling image into a color space corresponding to the second CFA, based on the conversion matrix and the bias obtained in operation 120. The second CFA may be or correspond to a different type of CFA of which a combination of filters is different from the first CFA. The first CFA may be determined to have a wider color spectrum than the second CFA. For example, referring to FIGS. 2C and 2D, when a CMY color spectrum is wider than an RGB color spectrum, the first CFA may be determined to be a CMY filter and the second CFA may be determined to be an RGB filter. As crosstalk between sensor noise and a channel increases as a pixel of a sensor is downsized, a sensor having a wide color spectrum such as a complementary color sensor may be used to increase an amount of light received from the sensor. Accordingly, the first CFA may have color filters having a wider color spectrum than the second CFA. Hereinafter, the second CFA is described as an RGB Bayer filter, as shown in FIG. 2A, including primary color filters of red, green, and blue.

Each pixel of the converted full sampling image may include values of channels included in the second CFA. In other words, each pixel of the full sampling image obtained in operation 110 may include values of channels C, M, and Y, which are a plurality of channels included in the first CFA, and each pixel of the full sampling image converted in operation 130 may include values of channels R, G, and B, which are a plurality of channels included in the second CFA.

Operation 130 may include an operation of converting the values of channels of the first CFA corresponding to each pixel of the full sampling image into values of channels of the second CFA, by performing an operation with the conversion matrix obtained in operation 120 and the pixel values of the full sampling image obtained in operation 110, based on a preset equation.

For example, a converted full sampling image including a pixel having values [R, G, B] of channels of the second CFA may be obtained by an operation that multiplies values [M, Y, C] of channels of the first CFA corresponding to each pixel of the full sampling image by a conversion matrix C, and adds a bias B.

$$\begin{bmatrix} R \\ G \\ B \end{bmatrix} = C \cdot \begin{bmatrix} M \\ Y \\ C \end{bmatrix} + B = \begin{bmatrix} C_{1 \times 1} & C_{1 \times 2} & C_{1 \times 3} \\ C_{2 \times 1} & C_{2 \times 2} & C_{2 \times 3} \\ C_{3 \times 1} & C_{3 \times 2} & C_{3 \times 3} \end{bmatrix} \cdot \begin{bmatrix} M \\ Y \\ C \end{bmatrix} + \begin{bmatrix} b_1 \\ b_2 \\ b_3 \end{bmatrix} \quad \text{Equation 4}$$

In other words, by performing an operation, based on the conversion matrix and the bias, on values of channels of the first CFA corresponding to each pixel of the full sampling image by a preset equation, such as Equation 4 above, for example, values of channels of the second CFA corresponding to each pixel of the full sampling image may be obtained. By converting the values of channels of the first CFA corresponding to each pixel of the full sampling image into the values of channels of the second CFA, the color space, corresponding to the first CFA, of the full sampling image may be converted into a color space corresponding to the second CFA. A full sampling image including a pixel having values of channels of the second CFA by operation 130 may be referred to as a converted full sampling image.

The image processing method may further include an operation of obtaining a second CFA-based image by 12osa-icking the converted full sampling image after operation 130. In contrast to demosaicing, 12osaicking may be a technique of converting an image including values of channels in one pixel into an image having one value of one channel in one pixel. For example, when H denotes the number of horizontal pixels of an image and V denotes the number of vertical pixels of the image, by 12osaicking a full sampling image having a size of H×V×3ch, a CFA-based image having a size of H×V×1ch may be obtained. In other words, the converted full sampling image may be converted into the second CFA-based image of which each pixel has any one of values of channel R, channel G, and channel B, by applying a 12osaicking algorithm.

Figure 3:
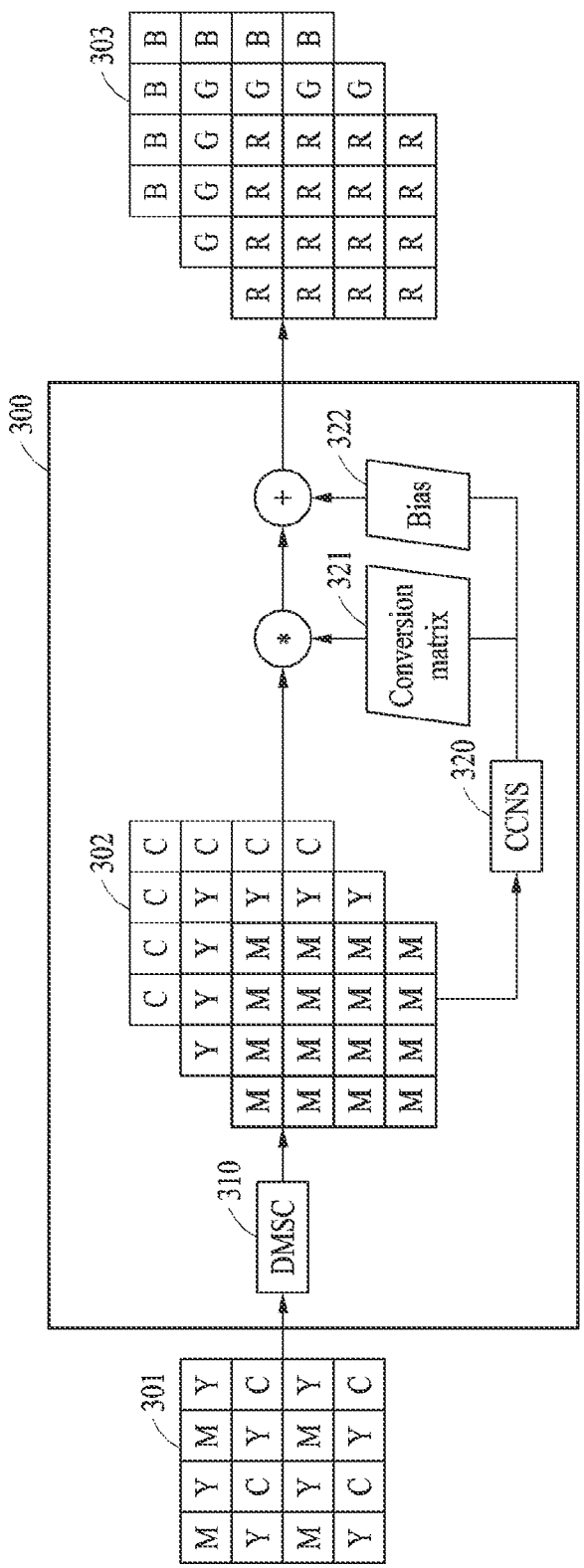
FIG. 3 illustrates an example of an operation of an image processing apparatus.

FIG. 3 illustrates an example of an operation of an image processing apparatus.

Referring to FIG. 3, an image processing apparatus 300 may output a full sampling image 303 converted into a color space corresponding to a second CFA by receiving a first CFA-based image 301, and may include a demosaicing (DMSC) model 310 configured to perform a demosaicing operation and a color conversion and noise suppression (CCNS) model (or, a color conversion model) 320 configured to perform an operation of color conversion suppressing noise. The image processing apparatus 300 may be or correspond to an apparatus that performs the image processing method described with reference to FIG. 1.

The DMSC model 310 may be or correspond to a model configured to output a full sampling image 302 corresponding to a first CFA by receiving the first CFA-based image 301. For example, the first CFA-based image 301 may be or correspond to a CMY Bayer filter-based image, and the DMSC model 310 may output the full sampling image 302 including values of channels C, M, and Y corresponding to each pixel by receiving the CMY Bayer filter-based image as an input.

The DMSC model 310 may output the full sampling image 302 having values of all channels in one pixel by applying a demosaicing algorithm to the first CFA-based image 301 having a value of one channel in one pixel. For example, as described above, the demosaicing algorithm may include an operation of obtaining a value of a channel, which does not exist in a corresponding pixel, by multiplying a weight by a value of a channel corresponding to a predetermined pixel of the first CFA-based image 301, and/or an operation of obtaining values of channels respectively corresponding to the pixels of the full sampling image by applying the first CFA-based image to at least one trained layer (e.g., one or more trained layers). The DMSC model 310 may include a model configured to output the full sampling image 302 corresponding to the first CFA, from the first CFA-based image 301, based on a different demosaicing algorithm than the demosaicing algorithm described above.

The color conversion model 320 may be or correspond to a model configured to output a conversion matrix 321 and a bias 322 by receiving the full sampling image 302 output from the DMSC model 310. By performing an operation with the conversion matrix 321, the bias 322, and pixel values of the full sampling image 302, based on a preset equation by the image processing apparatus 300, the full sampling image 303 of which values of channels of the first CFA respectively corresponding to pixels of the full sampling image 302 are converted into values of channels of the second CFA, may be obtained. As the Equation 4 described above, the preset equation may indicate an operation of multiplying the conversion matrix 321 by the values of channels corresponding to each pixel of the full sampling image 302 output from the DMSC model 310, and adding the bias 322 to the multiplication result. For example, the full sampling image 303 converted into the values of channels of the second CFA may be or correspond to an image including values of channels R, G, and B, corresponding to each pixel.

Figure 4:
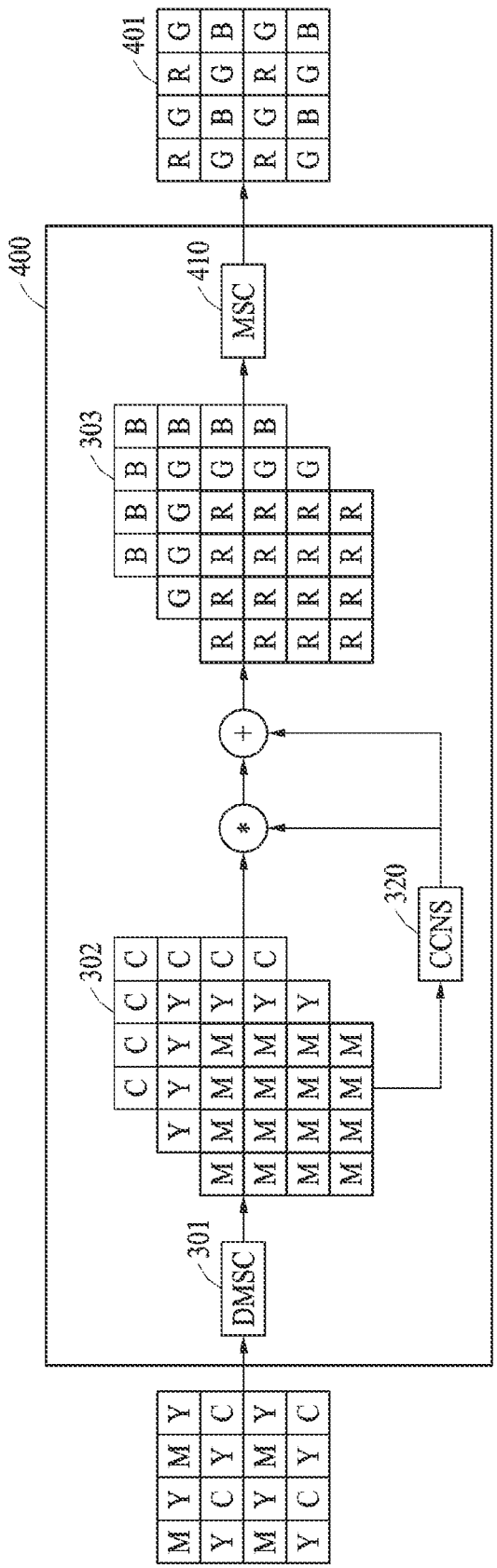
FIG. 4 illustrates an example of an operation of an image processing apparatus including a mosaicing operation.

FIG. 4 illustrates an example of an operation of an image processing apparatus including a 14osaicking operation.

Referring to FIG. 4, an image processing apparatus 400 may be or correspond to an apparatus further including a 14osaicking model 410 configured to perform a 14osaicking operation with the image processing apparatus 300 described with reference to FIG. 3. The 14osaicking model 410 may be or correspond to a model configured to output a second CFA-based image 401 by 14osaicking the converted full sampling image 303 obtained by performing an operation on the full sampling image 302 output from the DMSC model 310 with the conversion matrix and the bias output from the color conversion model 320. Unlike the image processing apparatus 300 described with reference to FIG. 3, an output from the image processing apparatus 400 may be the second CFA-based image 401, and the second CFA-based image 401 including a value of any one of channels corresponding to a second CFA corresponding to each pixel may be output.

Figure 5:
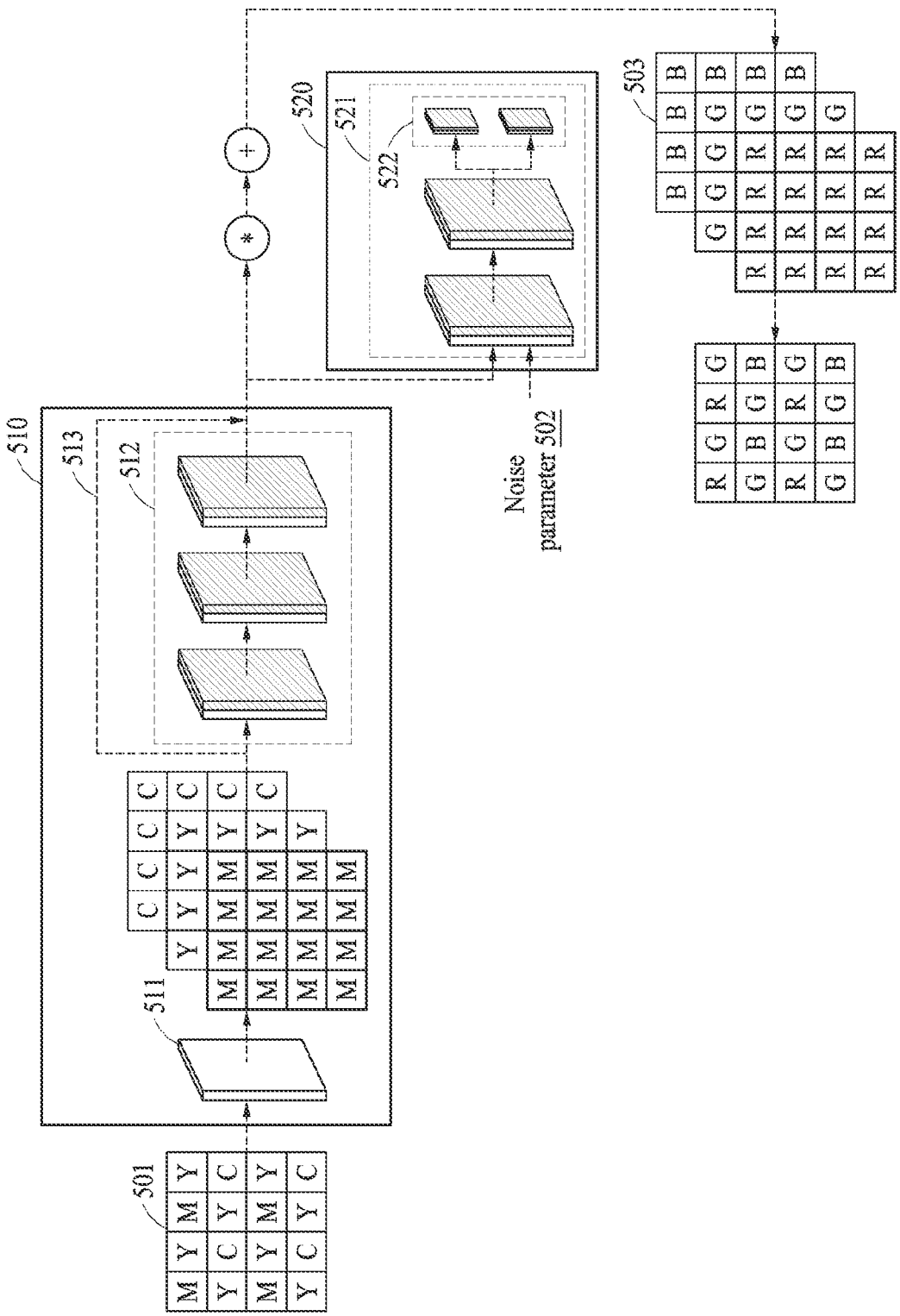
FIG. 5 illustrates an example of a structure of a demosaicing model and a color conversion model.

FIG. 5 illustrates an example of a structure of a demosaicing model and a color conversion model.

Referring to FIG. 5, a DMSC model 510 may include an interpolation layer 511 and at least one trained layer (e.g., one or more trained layers) 512. For example, the at least one trained layer 512 may include a set of an activation layer and at least one convolutional layer (e.g., a plurality of sets of an activation layer and at least one convolutional layer).

The interpolation layer 511 may include an estimated weight corresponding to each channel of a first CFA, and may be or correspond to a layer configured to output a full sampling image by obtaining a value of a channel, which does not exist in each pixel of an applied image. For example, by performing an operation of Equation 1 on each pixel of an applied image, the interpolation layer 511 may output a full sampling image including all values of channels Y, M, and C, corresponding to the each pixel. The estimated weight, included in the interpolation layer 511, corresponding to each channel of the first CFA may be obtained by training of the DMSC model 510. For example, in a process of training the DMSC model 510, a weight of the interpolation layer 511 corresponding to each channel of the first CFA may be determined.

The at least trained layer 512 included in the DMSC model 510 may be or correspond to a layer of which a weight is updated by training of the DMSC model 510. The full sampling image output from the interpolation layer 511 may be applied to the at least one trained layer 512, and values of channels corresponding to each pixel of the full sampling image may be updated through the at least one trained layer 512. A weight of the at least one trained layer 512 may be determined during the process of training the DMSC model 510. A non-limiting example of the training of the DMSC model 510 will be described below. The at least one trained layer 512 may include residual connection 513 between an input and an output.

Referring to FIG. 5, a color conversion model 520 may include at least one trained layer (e.g., one or more trained layers) 521, and a layer 522 including an output layer may be divided into two layers and the two layers may output a conversion matrix and a bias, respectively. For example, the at least one trained layer 521 may include a set of an activation layer and at least one convolutional layer.

The at least one trained layer 521 included in the color conversion model 520 may be or correspond to layers of which weights are updated by training of the color conversion model 520. In a process of training the color conversion model, a weight of The at least one layer 521 may be determined. A non-limiting example of the training of the color conversion model 520 will be described below.

The trained color conversion model 520 may control a level of noise reduction of an image output from a trained color conversion model, based on a noise parameter 502 corresponding to brightness of an input image. For example, the noise parameter 502 may be determined to be a normalized value where a value, obtained by multiplying an analog gain by a digital gain of a sensor that received an input image 501, is normalized to be between equal to or greater than 0 and equal to or less than 1. The noise parameter 502 may be determined to be a small value when an environment in which the input image 501 is received is bright, and may be determined to be a large value when an environment in which the input image is received is dark, and may perform a function that controls brightness of an output image 503 based on brightness of the input image 501. In a process of training the color conversion model 510, a training image included in training data may have various noise levels, and the training data and a value based on brightness of the training image may be input to the color conversion model 520. Based on the noise parameter 502 corresponding to brightness of the input image 501, a level of noise reduction output from the color conversion model 520 may be controlled.

Figure 6:
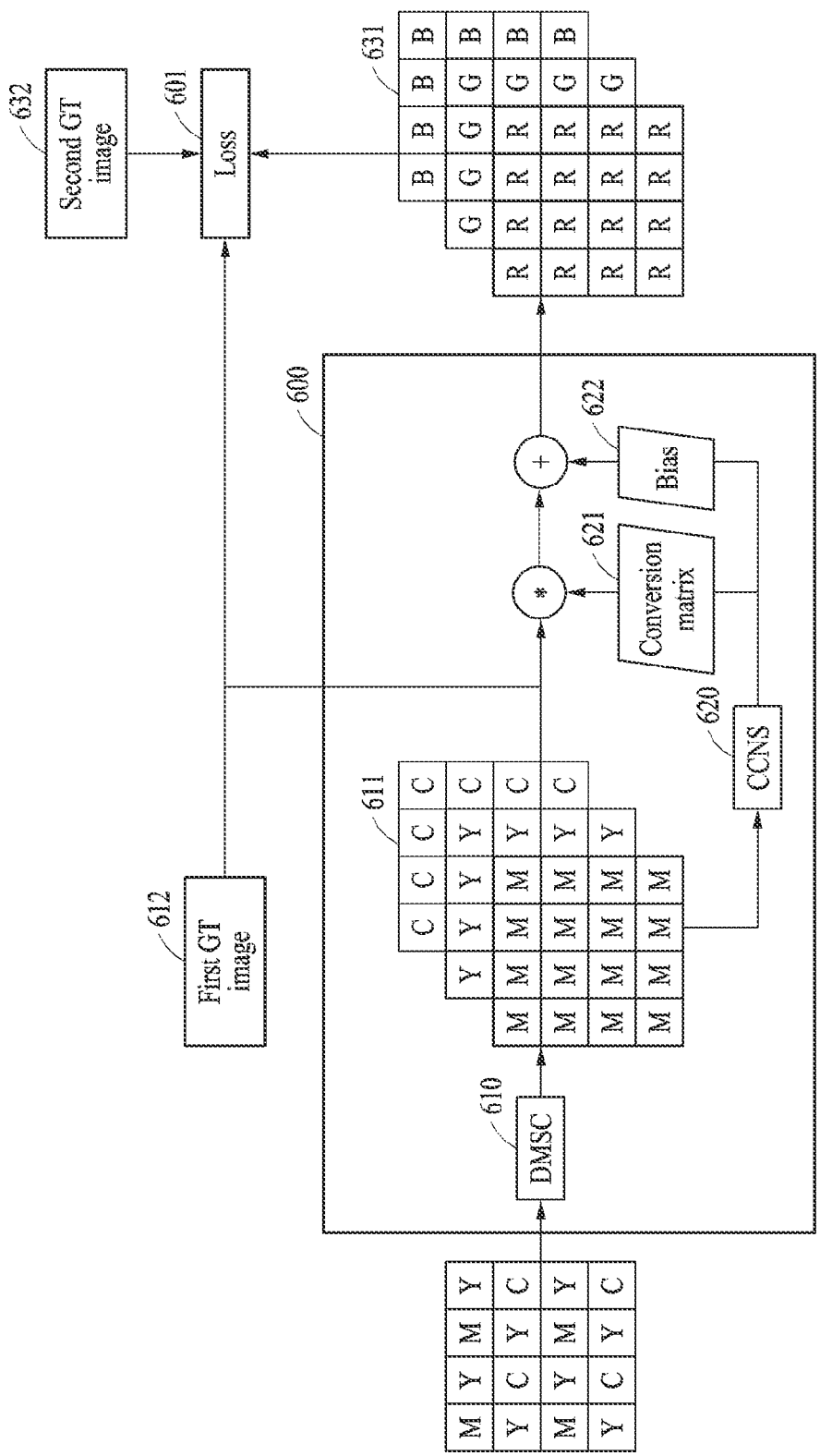
FIG. 6 illustrates an example of a learning method of an image processing apparatus.

FIG. 6 illustrates an example of a learning method of an image processing apparatus.

Referring to FIG. 6, a loss function Loss 601 for training a DMSC model 610 and a color conversion model 620 of an image processing apparatus 600 may be determined based on a difference between a full sampling image 611, which is an output from the DMSC model 610, and a first ground truth (GT) image 612, which is a ground truth image corresponding thereto, and a difference between a full sampling image 631 having a converted color space and estimated based on an output of the color conversion model 620, and a second GT image 632, which is a ground truth image of the full sampling image 631 having the converted color space.

For example, the loss function 601 may be or correspond to a weighted sum of a first loss between an output image I' (e.g., the full sampling image 611) of the DMSC model 610 and a ground truth image I (e.g., the first GT image 612) of an output corresponding to an input of the DMSC model, and a second loss between an output I'×C+B (e.g., the full sampling image 631) of the color conversion model and a ground truth image O (e.g., the second GT image 632) of an output corresponding to an input of the color conversion model, and may be determined by Equation 5 shown below, for example.

$$\text{Loss} = \lambda_1 \times \text{MAE}(I'-I) + \lambda_2 \times \text{MAE}(I' \times C + B - O) \quad \text{Equation 5:}$$

In Equation 5, the first loss and the second loss may be or correspond to an L1 loss (for example, a mean absolute error (MAE)), and $\lambda_1$ and $\lambda_2$ may denote a weight for the first loss and a weight for the second loss, respectively.

For example, the loss function may be defined by an L2 loss (for example, a mean squared error (MSE)), as Equation 6 shown below, for example.

$$\text{Loss} = \lambda_1 \times \text{MSB}(I'-I) + \lambda_2 \times \text{MSE}(I' \times C + B - O) \quad \text{Equation 6:}$$

Equations 5 and 6 are examples of a loss function, and the loss function is not limited thereto. The loss function may include various types of loss functions with respect to a difference between a full sampling image of a color space corresponding to the first CFA and ground truth data corresponding to a training image.

Based on the loss function 601, the DMSC model 610 may estimate an accurate pixel value (M, Y, C) of the full sampling image 611, and the color conversion model may be trained to estimate a conversion matrix 621 and a bias 622 for converting the pixel value (M, Y, C) into a noise-suppressed pixel value (R, G, B).

For example, training data of the DMSC model 610 and the color conversion model 620 may include an RGB full sampling image (or, an sRGB image), an RGB Bayer image obtained by applying inverse ISP and inversion CCM to an sRGB image, and a CMY Bayer image. In addition, training data including an RGB image and a CMY image may be obtained using a hyperspectral image including spectral information in various wavelength ranges through a spectrum of incident light.

In addition, images corresponding to different color spaces may be obtained by various methods, and the images corresponding to different color spaces may be used as training data for training the color conversion model 620.

Figure 7A:
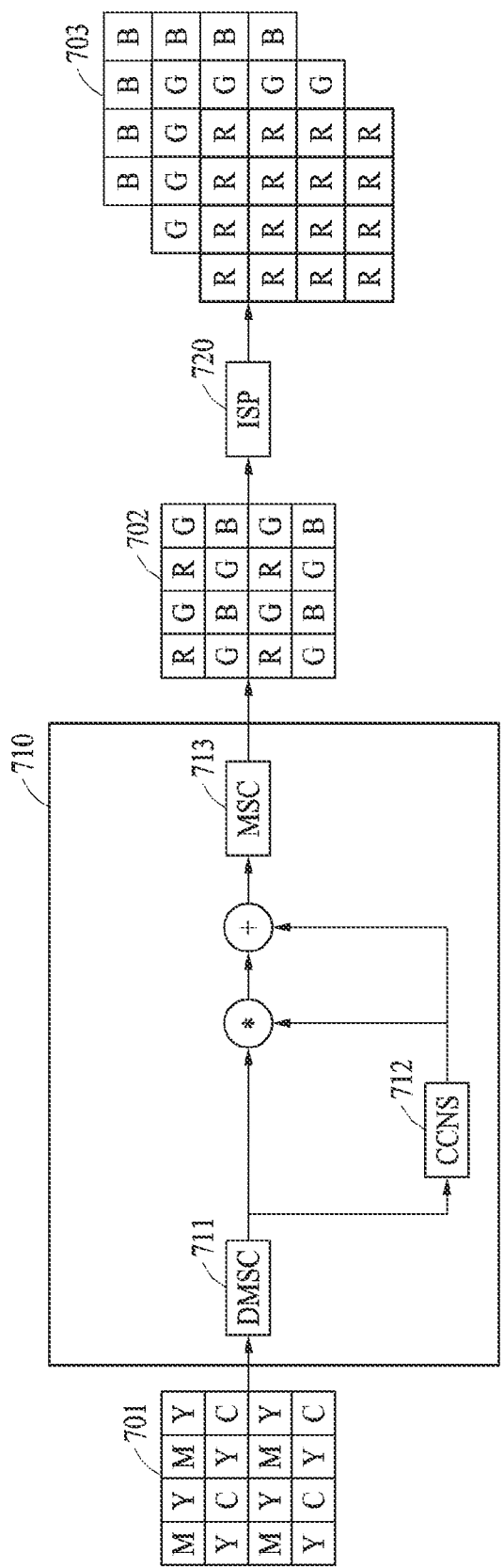
FIGS. 7A and 7B illustrate examples of application scenarios of an image processing apparatus.
Figure 7B:
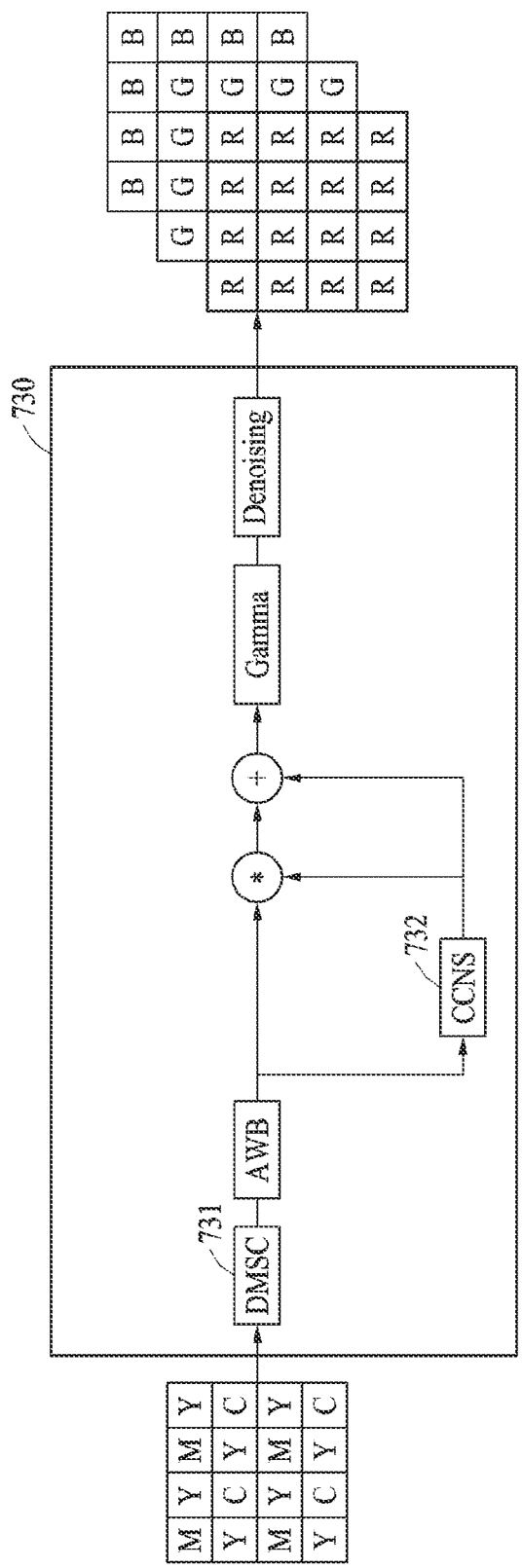

FIGS. 7A and 7B illustrate examples of application scenarios of an image processing apparatus.

Referring to FIG. 7A, an image processing apparatus 710 may be used as a preprocessing module of an image signal processing (ISP) module 720. The ISP module 720 may be an apparatus for converting an RGB Bayer image into an RGB image, and may include various ISP modules configured to convert the RGB Bayer image into the RGB image by various operating algorithms. As described above with reference to FIG. 4, the image processing apparatus 710 may further include a 17osaicking model 713 other than a DMSC model 711 and a color conversion model 712, and may output a second CFA-based image 702 by converting a first CFA-based input image 701. The second CFA-based image 702 output from the image processing apparatus 710 may be or correspond to an RGB Bayer image, and may be input to the ISP module 720 and converted into an RGB image 703. A quality of an RGB image output from the ISP module 720 may be improved by performing preprocessing for suppressing noise of an RGB Bayer Image input to the ISP module 720 by using the image processing apparatus 710.

Referring to FIG. 7B, a trained DMSC model 731 of an image processing apparatus described with reference to FIGS. 1 to 6, may replace a module, configured to perform demosaicing, of an ISP module 730, and a trained color conversion model 732 may replace a CCM module, configured to perform color correction on RGB data, of the ISP module.

Figure 8:
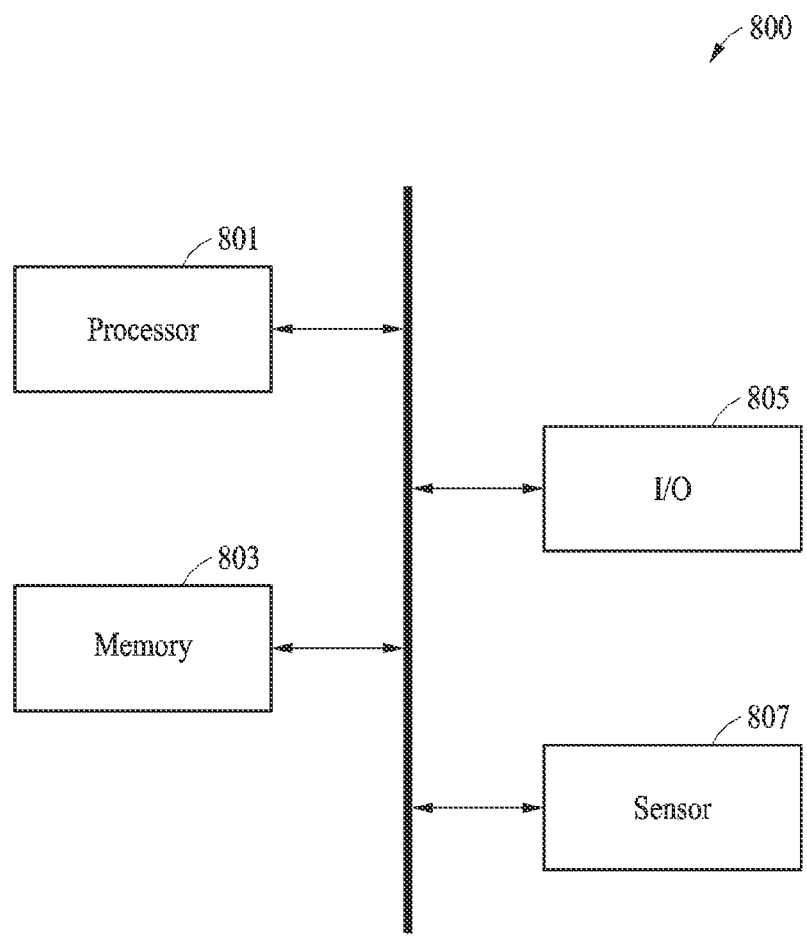
FIG. 8 illustrates an example of a hardware configuration of an apparatus.

FIG. 8 illustrates an example of a hardware configuration of an apparatus.

Referring to FIG. 8, a device 800 may include a processor 801 (e.g., one or more processors), a memory 803 (e.g., one or more memories), an input/output (I/O) device 805, and a sensor 807 (e.g., one or more sensors). The device 800 may be or include any one or more or all apparatuses for performing the image processing methods or the image processing apparatuses described with reference to FIGS. 1 to 7. For example, the device 800 may include at least one of a server and a user device (for example, a smartphone, a personal computer, a tablet PC), and may be mounted on a module that needs an image processing function by being implemented in a chip.

The processor 801 may perform the image processing method or at least one operation performed by the image processing apparatus described with reference to FIGS. 1 to 7. For example, the processor 801 may perform at least one operation of obtaining a full sampling image by demosaicing a first CFA-based input image, estimating a bias and a conversion matrix for CCNS of the full sampling image, and converting a color space of the full sampling image corresponding to a first CFA into a color space corresponding to a second CFA based on the bias and the conversion matrix.

The memory 803 may be a volatile or non-volatile memory, and may store data related or corresponding to the image processing method described with reference to FIGS. 1 to 7. For example, the memory 803 may store data generated during a process of performing the image processing method, or data necessary for performing the image processing method. For example, the memory 803 may store an image of the DMSC model of the image processing apparatus, conversion matrix and bias data output from the color conversion model, the DMSC model, which is obtained by training, and/or weights between layers of the color conversion model.

The memory 803 may store a program implementing the image processing method described with reference to FIGS. 1 to 7. The processor 801 may execute a program stored in the memory 803 and may control the device 800. Code of the program executed by the processor 801 may be stored in the memory 803.

The device 800 may be connected to an external device (e.g., a PC or a network) through the I/O device 805 to exchange data with the external device. For example, the device 800 may receive input image data from a sensor through the I/O device 805, and may output an image obtained by a result of image processing.

The sensor 807 may include an image sensor including a CFA combined with a monochrome pixel detecting brightness of black and white. The sensor 807 may generate a first CFA-based input image. The sensor 807 may be or include any one or more or all of the sensors and the image sensors discussed above with reference to FIGS. 1 to 7.

The device 800 may further include components not shown in drawings. For example, the device 800 may further include a communication module configured to communicate with another device. In addition, for example, the device 800 may further include other components such as a transceiver, various sensors, and a database.

The image processing apparatuses, devices, processors, memories, I/O devices, sensors, image processing apparatus 300, image processing apparatus 400, image processing apparatus 600, image processing apparatus 710, device 800, processor 801, memory 803, I/O device 805, sensor 807, and other apparatuses, units, modules, devices, and components described herein with respect to FIGS. 1-8 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. An apparatus with image processing, the apparatus comprising:
   one or more processors configured to:
   generate a full sampling image by demosaicing a first color filter array (CFA)-based input image;
   based on a trained color conversion model trained for color conversion and noise suppression of the full sampling image, determine a bias and a conversion matrix corresponding to each pixel of the full sampling image; and
   based on the conversion matrix and the bias, convert a color space of the full sample image, corresponding to the first CFA, into a color space corresponding to a second CFA.

2. The apparatus of claim 1, wherein the trained color conversion model is trained based on a loss function corresponding to a difference between another full sampling image, determined to correspond to a training image, of a color space corresponding to a second CFA and ground truth data corresponding to the training image.

3. The apparatus of claim 1, wherein the trained color conversion model comprises a first output layer configured to output the conversion matrix corresponding to the full sampling image and a second output layer configured to output the bias corresponding to the full sampling image.

4. The apparatus of claim 1, wherein the trained color conversion model is configured to control, based on a noise parameter corresponding to brightness of the CFA-based input image, a level of noise reduction of an image output using the trained color conversion model.

5. The apparatus of claim 1, wherein, for the generating of the full sampling image, the one or more processors are configured to:
   based on a determined weight corresponding to each channel of the first CFA and a value of a channel of the first CFA corresponding to each pixel of an input image, generate the full sampling image comprising values of channels of the first CFA corresponding to each of the pixels of the input image; and
   update values of channels corresponding to each pixel of the full sampling image by applying the full sampling image to at least one trained layer.

6. The apparatus of claim 5, wherein
   the determined weight corresponding to each channel of the first CFA is determined using a trained demosaicing model,
   the at least one trained layer is comprised in the trained demosaicing model, and
   the trained demosaicing model is trained based on a loss function based on a difference between the full sampling image of the color space corresponding to the first CFA determined to correspond to a training image and ground truth data corresponding to the training image.

7. The apparatus of claim 1, wherein, for the converting of the color space of the full sampling image, the one or more processors are configured to, based on a preset equation, by performing an operation with the conversion matrix, the bias, and a pixel value of the full sampling image, convert values of channels of the first CFA corresponding to each pixel of the full sampling image into values of channels of the second CFA.

8. The apparatus of claim 1, wherein the one or more processors are configured to generate a second CFA-based image by mosaicing the converted full sampling image.

9. The apparatus of claim 1, wherein
   each pixel of the first CFA-based input image comprises a value of any of channels comprised in the first CFA,
   each pixel of the full sampling image comprises values of the channels comprised in the first CFA, and
   each pixel of the converted full sampling image comprises values of channels comprised in the second CFA.

10. The apparatus of claim 1, wherein a color spectrum corresponding to the first CFA is wider than a color spectrum corresponding to the second CFA.

11. The apparatus of claim 1, wherein
    the first CFA comprises complementary color filters in cyan, magenta, and yellow, and the second CFA comprises primary color filters in red, green, and blue.

12. A processor-implemented method with image processing, the method comprising:
    generating a full sampling image by demosaicing a first color filter array (CFA)-based input image;
    based on a trained color conversion model trained for color conversion and noise suppression of the full sampling image, determining a bias and a conversion matrix corresponding to each pixel of the full sampling image; and
    based on the conversion matrix and the bias, converting a color space of the full sampling image, corresponding to the first CFA, into a color space corresponding to a second CFA.

13. The method of claim 12, wherein the trained color conversion model is trained based on a loss function corresponding to a difference between another full sampling image, determined to correspond to a training image, of a color space corresponding to a second CFA and ground truth data corresponding to the training image.

14. The method of claim 12, wherein the trained color conversion model comprises a first output layer configured to output the conversion matrix corresponding to the full sampling image and a second output layer configured to output the bias corresponding to the full sampling image.

15. The method of claim 12, wherein the trained color conversion model is configured to control, based on a noise parameter corresponding to brightness of the CFA-based input image, a level of noise reduction of an image output using the trained color conversion model.

16. The method of claim 12, wherein the generating of the full sampling image comprises:
    based on a determined weight corresponding to each channel of the first CFA and a value of channel of the first CFA corresponding to each pixel of the input image, generating the full sampling image comprising values of channels of the first CFA corresponding to each of the pixels of the input image; and
    updating values of channels corresponding to each pixel of the full sampling image by applying the full sampling image to at least one trained layer.

17. The method of claim 16, wherein
    the determined weight corresponding to each channel of the first CFA is determined using a trained demosaicing model,
    the at least one trained layer is comprised in the trained demosaicing model, and
    the trained demosaicing model is trained based on a loss function based on a difference between the full sampling image of the color space corresponding to the first CFA determined to correspond to a training image and ground truth data corresponding to the training image.

18. The method of claim 12, wherein the converting of the color space of the full sampling image comprises, based on a preset equation, by performing an operation with the conversion matrix, the bias, and a pixel value of the full sampling image, converting values of channels of the first CFA corresponding to each pixel of the full sampling image into values of channels of the second CFA.

19. The method of claim 12, further comprising generating a second CFA-based image by mosaicing the converted full sampling image.

20. A non-transitory computer-readable storage medium storing instructions that, when executed by one or more processors, configure the one or more processors to perform the method of claim 12.

21. An apparatus with image processing, the apparatus comprising:
    one or more processors configured to:
        generate a first full sampling image by demosaicing a training image obtained using a first color filter array (CFA);
        generate, using a color conversion model, a second full sampling image, corresponding to a second CFA, based on the first full sampling image;
        obtain a first ground truth (GT) image corresponding to the first full sampling image and a second GT image corresponding to the second full sampling image; and
        train the color conversion model based on a loss function corresponding to a difference between the first full sampling image and the first GT image and a difference between the second full sampling image and the second GT image.

22. The apparatus of claim 21, wherein the one or more processors are further configured to:
    generate a third full sampling image by demosaicing a first color filter array (CFA)-based input image;
    based on the trained color conversion model, determine a bias and a conversion matrix corresponding to each pixel of the third full sampling image; and
    based on the conversion matrix and the bias, convert a color space of the third full sample image, corresponding to the first CFA, into a color space corresponding to the second CFA.

23. The apparatus of claim 21, wherein
    for the generating of the first full sampling image, the one or more processors are configured to generate the first full sampling image using a demosaicing (DMSC) model, and
    the one or more processors are further configured to train the DMSC model based on the loss function.

24. The apparatus of claim 21, the loss function corresponds to either one of mean absolute error (MAE) and mean squared error (MSE).

* * * * *